US012794771B2

(12) United States Patent
Chibon et al.

(10) Patent No.: US 12,794,771 B2
(45) Date of Patent: Nov. 10, 2026

(54) COORDINATING SOFTWARE MODIFICATIONS FOR REMOTE NODE MANAGEMENT

(71) Applicant: Red Hat, Inc., Raleigh, NC (US)

(72) Inventors: Pierre-Yves Chibon, Saint-Pol-de-Leon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 641 days.

(21) Appl. No.: 18/345,546

(22) Filed: Jun. 30, 2023

(65) Prior Publication Data

US 2025/0007777 A1 Jan. 2, 2025

(51) Int. Cl.

*H04L 41/082* (2022.01)
*G06F 8/65* (2018.01)
*G06F 8/71* (2018.01)
*G06F 8/76* (2018.01)
*H04L 41/08* (2022.01)

(52) U.S. Cl.

CPC .............. *H04L 41/082* (2013.01); *G06F 8/65* (2013.01); *G06F 8/71* (2013.01); *G06F 8/76* (2013.01); *H04L 41/0886* (2013.01)

(58) Field of Classification Search

CPC ..... H04L 41/082; H04L 41/0886; G06F 8/65; G06F 8/71; G06F 8/76

See application file for complete search history.

(56) References Cited

U.S. PATENT DOCUMENTS 10,013,491 B2 * 7/2018 Vasudevan .......... H04L 67/1095
10,042,744 B2 * 8/2018 Herrin ....................... G06F 8/71
11,334,396 B2 5/2022 Prince et al.
2018/0088935 A1 3/2018 Church et al.
2019/0190776 A1 * 6/2019 Bregman ............ G06F 9/45558
2020/0059420 A1 * 2/2020 Abraham ............ H04L 41/0843

(Continued)

FOREIGN PATENT DOCUMENTS

CN 111752581 A 10/2020

OTHER PUBLICATIONS

Anonymous, "Integrating Ansible and Docket for a CI/CD Pipeline Using Jenkins," G-Core Labs S.A., Apr. 12, 2023: pp. 1-23, <https://gcore.com/blog/integrating-ansible-and-docker-in-ci-cd-process-using-jenkins-job/>.

(Continued)

*Primary Examiner* — Lewis A Bullock, Jr.
*Assistant Examiner* — Theodore E Hebert
(74) *Attorney, Agent, or Firm* — Kilpatrick Townsend & Stockton LLP

(57) ABSTRACT

Software modifications can be coordinated for remote node management. For example, a system can detect, at a first time, a code modification made to a first configuration file on a particular node of a plurality of nodes. The first configuration file can be used by a control node to deploy a software entity to each of the nodes. The system can convert the code modification from a first format associated with the control node to a second format associated with the software entity. At a second time, the system can detect the control node executing the first configuration file to deploy the software entity to each node according to a second configuration file for the software entity. The system can apply the code modification to the second configuration file such that the control node can deploy the software entity to the particular node using the applied code modification.

20 Claims, 3 Drawing Sheets

(56) References Cited

U.S. PATENT DOCUMENTS

| | | | | |
|---|---|---|---|---|
| 2020/0285526 A1* | 9/2020 | Prince | H04L 41/5096 | |
| 2023/0244466 A1* | 8/2023 | Shah | G06F 9/541 | 717/178 |
| 2023/0251910 A1* | 8/2023 | Holt | G06F 3/0486 | 719/328 |
| 2023/0259390 A1* | 8/2023 | Howley | G06F 8/63 | 718/102 |
| 2024/0220227 A1* | 7/2024 | Kerr | G06F 9/5077 | |
| 2025/0123826 A1* | 4/2025 | Chibon | G06F 9/44505 | |

OTHER PUBLICATIONS

Aleshkina, "Migrating Configuration Management Systems To Containers," South-Eastern Finland University of Applied Sciences, Dec. 2017: pp. 1-61, <https://www.theseus.fi/bitstream/handle/10024/139228/Aleshkina_Alina.pdf?sequence=1&isAllowed=y>.

Critelli, "Building, saving, and loading container images with Ansible," Red Hat, Inc., Jul. 7, 2020: pp. 1-6, <https://www.redhat.com/sysadmin/container-images-ansible>.

* cited by examiner

COORDINATING SOFTWARE MODIFICATIONS FOR REMOTE NODE MANAGEMENT

TECHNICAL FIELD

The present disclosure relates generally to remote node management. More specifically, but not by way of limitation, this disclosure relates to coordinating software modifications for remote node management.

BACKGROUND

Distributed computing systems (e.g., cloud computing systems, data grids, and computing clusters) have recently grown in popularity given their ability to improve flexibility, responsiveness, and speed over conventional computing systems. In some cases, the responsiveness and speed of distributed computing systems can be further improved by employing edge-computing solutions. Edge computing is a networking philosophy focused on bringing computing power and data storage as close to the source of the data as possible to reduce latency and bandwidth usage. Edge computing solutions involve executing services on nodes (e.g., servers or virtual machines) positioned at physical edges of a computing environment that are geographically close to corresponding client devices, to reduce latency and improve a perceived quality of the services.

DETAILED DESCRIPTION

Figure 1:
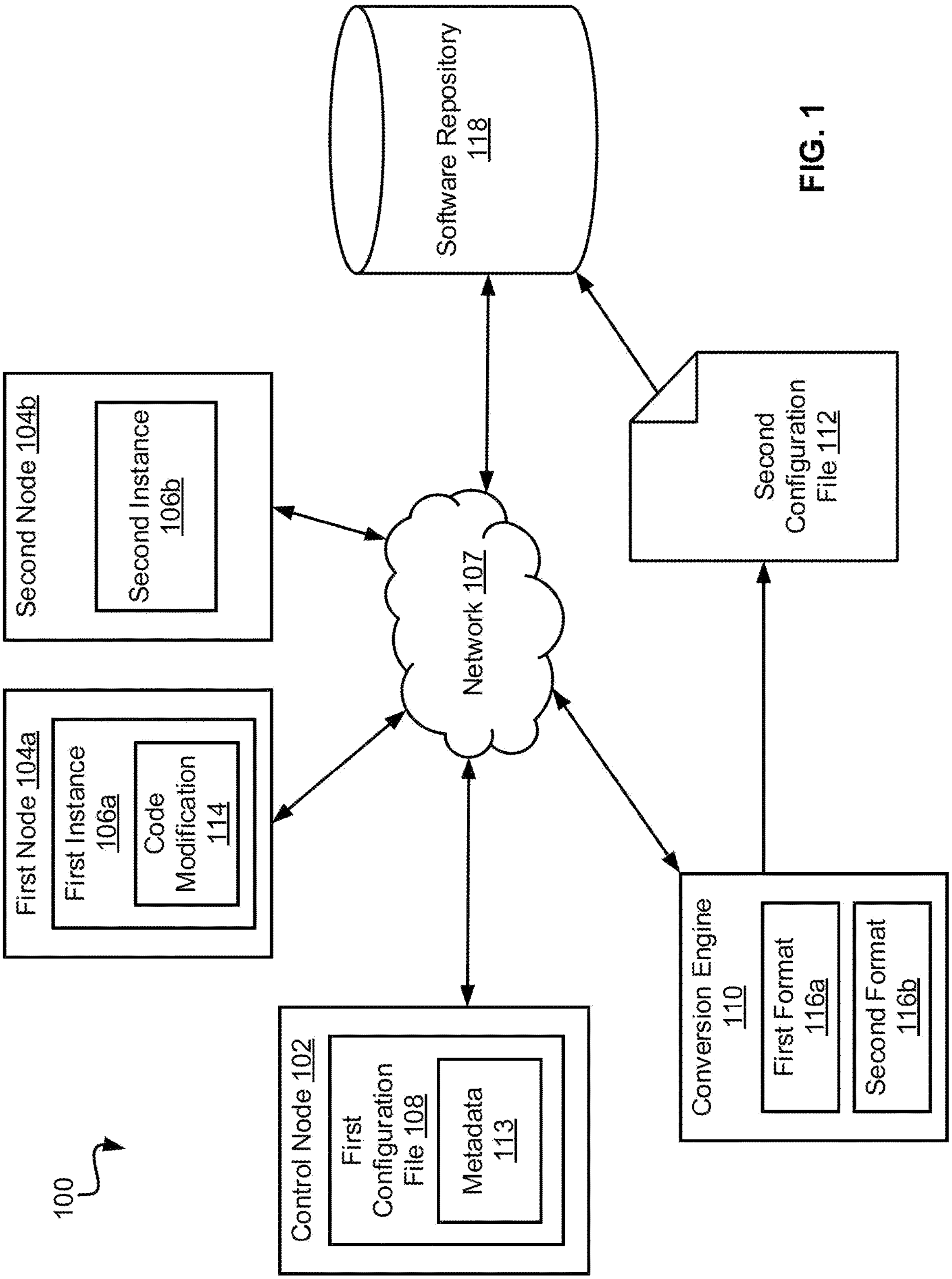
FIG. 1 is a block diagram of an example a distributed computing environment for coordinating software modifications for remote node management according to some examples of the present disclosure.

Configuration management and automation systems such as Ansible by Red Hat® can be used to manage nodes in an edge computing system. Such configuration management systems can enable infrastructure as code to deploy software (e.g., containers, virtual machines, applications, etc.) to multiple nodes at the same time (e.g., substantially contemporaneously). If issues arise with a node executing the software, the configuration management system can rerun the configuration file to deploy the software again and reestablish the same infrastructure. The configuration management system can also be used to apply software updates across multiple nodes. Such configuration management systems can uniformly deploy software in an "all or nothing" manner across nodes. In some cases, some individual nodes may require local adjustments to the software configuration. But such adjustments may not be replicated when subsequent updates or redeployments are performed by the configuration management system. Or, if the local adjustments are applied to the configuration management system as a whole instead of just being applied to a local node, the adjustments may be incorrectly deployed out to the entire fleet of nodes.

Some examples of the present disclosure can overcome one or more of the abovementioned problems via a conversion engine that can convert commands for adjusting software configuration on a local node to commands compatible with the software entity deployed by a configuration management system. When the configuration management system redeploys the software to nodes (including the local node with the local modification), the conversion engine can insert the converted commands into the configuration file for the software file for that particular node. Thus, the local modification can be applied to the associated node, without being applied to other nodes managed by the configuration management system. Individualized code modifications can therefore be applied in updates directly from configuration management systems, without requiring multiple steps of updating via the configuration management system and then updating configuration files for the software.

In one particular example, a control node can execute an Ansible playbook to install containers on nodes in a distributed computing environment. The Ansible playbook can define a default installation process for installing the container across the various nodes. The container itself can be installed according to a configuration file, such as a Containerfile. After the control node installs the container on the nodes, a configuration adjustment may be made to a container on one of the nodes. For example, a local system administrator may modify container code using Ansible commands to improve node performance. A conversion engine monitoring the distributed computing environment can detect the code modification and convert the Ansible commands into Containerfile compatible commands.

To use the Containerfile compatible commands in a subsequent container deployment, the conversion engine can attach metadata to the Ansible playbook to create a mapping between the Ansible playbook, the Containerfile, and the code modifications for the first node. When the control node re-executes the Ansible playbook at a subsequent time to re-deploy the container to the nodes, the metadata can be used to determine that code modifications are to be applied to the first node. For example, the code modifications (converted to be compatible with Containerfile) can be applied to the specific Containerfile used to create the container on the first node. Thus, the container can be updated directly from the Ansible playbook along with the changes previously applied to the first node.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example a distributed computing environment 100 for coordinating software modifications for remote node management according to some examples of the present disclosure. In some examples, the distributed computing environment 100 may be an edge computing environment, a cloud computing environment, or a computing cluster, formed from one or more nodes (e.g., physical or virtual servers) that are in communication with one another via a network 107, such as a local area network (LAN), wide area network (WAN), the Internet, or any combination thereof.

The distributed computing environment 100 can include a control node that can manage the first node 104*a* and the second node 104*b*. Examples of the nodes can include a desktop computer, a laptop computer, a server, a mobile phone, a tablet, etc. The control node 102 can control deployment of instances 106*a-b* of a software entity on the nodes 104*a-b* using a configuration management system such as Ansible by Red Hat®. For example, the control node 102 can use a first configuration file 108 (e.g., an Ansible playbook) to automate deployment of the software entity. The first configuration file 108 can include a list of tasks that the control node 102 can execute to deploy the software entity to the nodes 104*a-b* or to containers or virtual machines executing on the nodes 104*a-b*. The first configuration file 108 can also be executed to deploy updates and configure networking, security, user management, and cloud management for the distributed computing environment 100.

The control node 102 can execute the first configuration file 108 to deploy instances 106*a-b* of a software entity, such as a container, virtual machine, application, or any other type of software service to both of the nodes 104*a-b*. For example, copies of the first configuration file 108 can be pushed down to the nodes 104*a-b*. The first configuration file 108 can dictate that an instance 106 of a software entity is to be built according to a second configuration file 112 from a software repository 118. For example, the software entity may be a container, the second configuration file 112 may be a container specification file, and the software repository 118 may be a container registry. Instances of the same container build from the container specification file may be built on each of the first node 104*a* and the second node 104*b*. But in some examples, configuration of the first node 104*a* may be adjusted (e.g., manually by a user or as part of an automated process) after the first instance 106*a* is deployed.

For example, a copy of the first configuration file 108 (e.g., Ansible playbook) on the first node 104*a* may be modified to change a value in the first configuration file 108:

name: Replace old hostname with new hostname
ansible.builtin.replace
path: /etc/myapp/myapp.conf
regexp: 'hostname=old\.host\.name'
replace: 'hostname=new.host.name'

The above commands for the code modification 114 are written in Ansible command format, and are not compatible with the second configuration file used to build the container (e.g., Containerfile commands). Additionally, further software deployments by the control node to the nodes 104*a-b* may not include the code modification 114, requiring the code modification 114 to be manually applied after each software deployment. Thus, the conversion engine 110 can be used to monitor the nodes 140*a-b* for code modifications.

For example, the conversion engine 110 can monitor adjustments to the first configuration file 108 on the nodes 104*a-b*. In some examples, the conversion engine 110 may detect the code modification 114 in response to the nodes 104*a-b* sending an alert for the code modification 114. That is, not all code modifications 114 may be detected and addressed by the conversion engine 110, such as code modifications 114 made for security, privacy, compliance, or regulatory reasons. Thus, the nodes 104*a-b* may have local control over what code modifications 114 are propagated to subsequent software deployments.

After detecting the code modification 114 to the first configuration file 108, the conversion engine 110 can convert the code modification 114 from the first format 116*a* to a second format 116*b*. In the example stated above, the code modification 114 was in a first format 116*a* of Ansible commands. But, the second configuration file 112 may be in a different, second format 116*b* of Containerfile commands. Thus, the conversion engine 110 can access a lookup table that maps Ansible commands to Containerfile commands to convert to the second format 116*b* (e.g., by converting the Ansible replace module with a 'sed' Containerfile command):

sed-i-e
"s|hostname=old\.host\.name|hostname=new.host.name|"/etc/myapp/myapp.conf Such commands in the second format 116*b* are compatible with the second configuration file 112. The conversion engine 110 can generate metadata 113 that can be attached to the first configuration file 108 to create a mapping between the converted code modification 114 and the second configuration file 112 for the first node 104*a*. For example, the metadata 113 may include a unique identifier for the container on the first node 104*a*. Subsequently, when the control node 102 pushes out another software deployment to the nodes 104*a-b*, the conversion engine 110 can detect this and can cause the code modification 114 to be applied solely to the first node 104*a*.

For example, after detecting that the control node 102 is executing the first configuration file 108 to redeploy instances 106*a-b* of the software entity, the conversion engine 110 or the control node 102 can insert the converted commands for the code modification 114 (e.g., in the second format 116*b* that is compatible with the second configuration file 112) into the second configuration file 112 when building the container on the first node 104*a*. The converted commands for the code modification 114 may not be injected into the second configuration file 112 when building the container on the second node 104*b*. Thus, the settings specific to the first node 104*a* can be maintained on the first node 104*a*, even for subsequent software deployments, by inserting converted commands into a specific configuration file. In other words, the first configuration file (e.g., Ansible playbook) can have exclusion capabilities to limit the code modification 114 to a subset of nodes for a software deployment.

In some examples, after the control node 102 has successfully redeployed the software entity using the code modification 114, the conversion engine 110 may update the second configuration file 112 to include the converted code modification 114. In such an example, the updated second configuration file 112 can be stored in the software repository 118 for use in subsequent deployments. Additionally, the metadata 113 indicating the code modification 114 can be discarded from the first configuration file 108. This can ensure a single source of truth for the modified container to reduce security risks and avoid conflicting instructions for implementing the code modification 114.

The next time the software entity (e.g., container) is built on the first node 104*a*, the changes originally made to the first configuration file 108 can be built in to the second configuration file 112. The metadata 113 can be discarded by the conversion engine 110, the control node 102, or any other entity in the distributed computing environment 100 such as a tower or a git repository. In one example, webhooks may be used to notify when a new container with the code modification 114 has been built, prompting the update of the second configuration file 112 and removal of the metadata 113 from the first configuration file 108.

While FIG. 1 depicts a specific arrangement of components, other examples can include more components, fewer components, different components, or a different arrangement of the components shown in FIG. 1. For instance, in other examples, a different number of instances of software entities may be installed on a different number of nodes. Additionally, any component or combination of components depicted in FIG. 1 can be used to implement the process(es) described herein.

Figure 2:
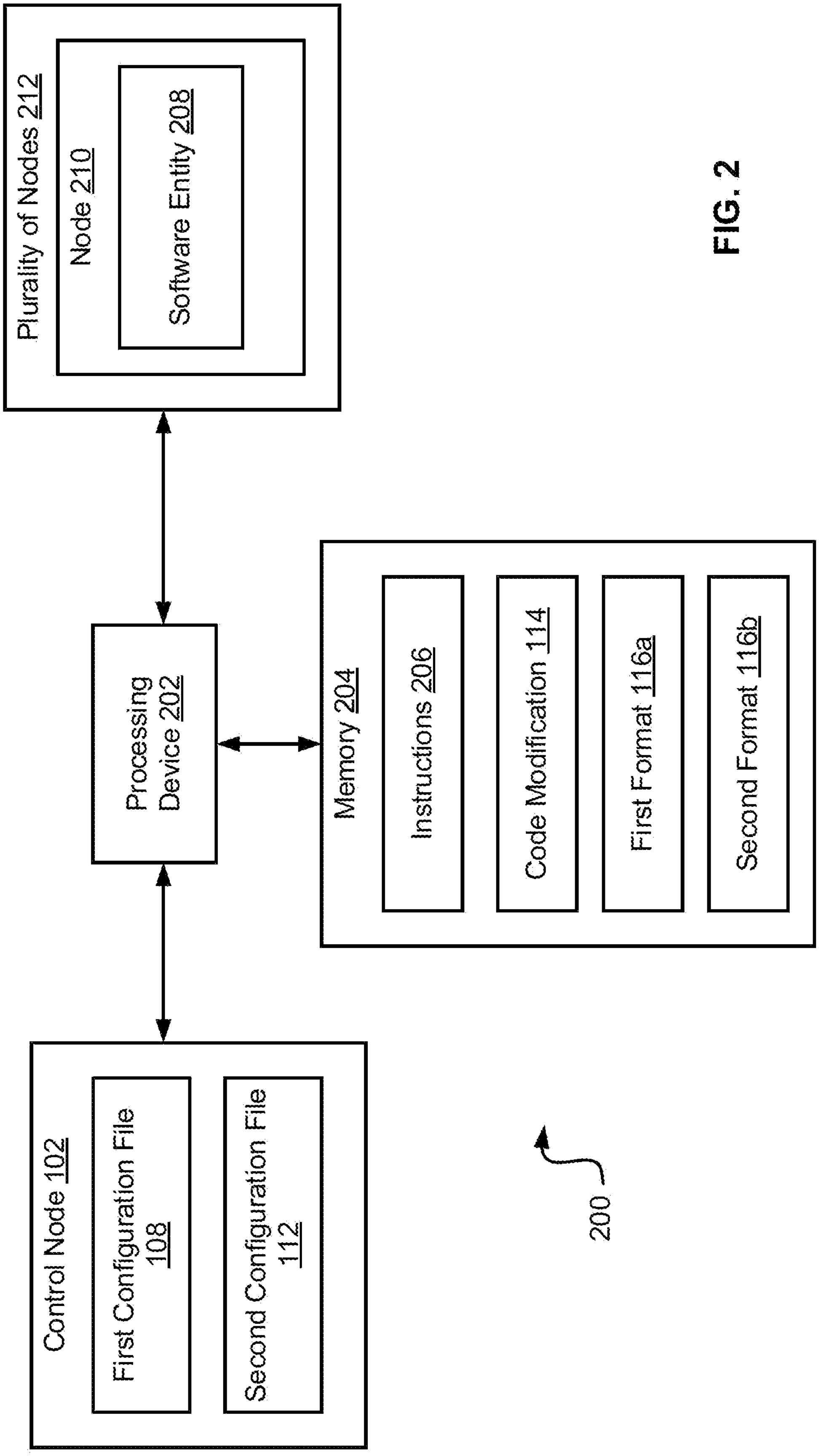
FIG. 2 is a block diagram of an example of a computing environment for coordinating software modifications for remote node management according to some examples of the present disclosure.

FIG. 2 is a block diagram of an example of a computing environment 200 for coordinating software modifications for remote node management according to some examples of the present disclosure. The computing environment 200 includes a processing device 202 communicatively coupled to a memory 204. In some examples, the components of the computing environment 200, such as the processing device 202 and the memory 204, may be part of a same computing device. In other examples, the processing device 202 and the memory 204 can be included in separate computing devices that are communicatively coupled.

The processing device 202 can include one processing device or multiple processing devices. Non-limiting examples of the processing device 202 can include a Field-Programmable Gate Array (FPGA), an application-specific integrated circuit (ASIC), and a microprocessor. The processing device 202 can execute instructions 206 stored in the memory 204 to perform computing operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206. In some examples, the instructions 206 may correspond to the conversion engine 110 described in FIG. 1.

In some examples, the processing device 202 can execute the instructions 206 to perform some or all of the functionality described herein. For example, the processing device 202 can detect, at a first time, a code modification 114 made to a first configuration file 108 on a particular node 210 of a plurality of nodes 212. The first configuration file 108 can be executed by a control node 102 to deploy a software entity 212 to each node of the plurality of nodes 212. The processing device 202 can convert the code modification 114 from a first format 116*a* associated with the control node 102 to a second format 116*b* associated with the software entity 212. The processing device 202 can detect, at a second time, the control node 102 executing the first configuration file 108 to deploy the software entity 212 to each node of the plurality of nodes 212 according to a second configuration file 112 for the software entity 212. The processing device 202 can apply, for the particular node 210, the code modification 114 in the second format 116*b* to the second configuration file 112 in response to detecting that the control node 102 is executing the first configuration file 108. The control node 102 can then deploy the software entity 212 to the particular node 210 using the code modification 114 applied to the second configuration file 112.

Figure 3:
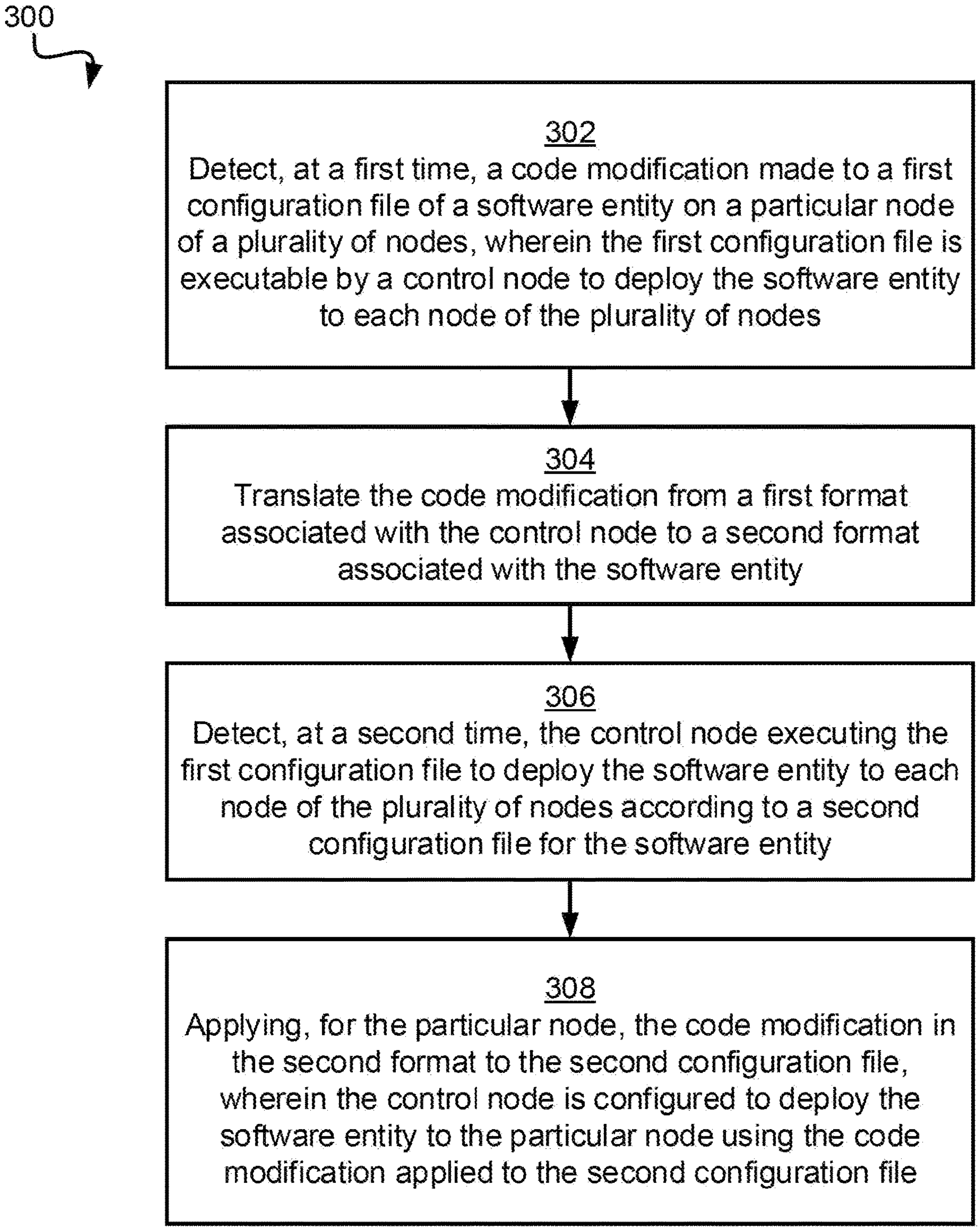
FIG. 3 is a flowchart of a process for coordinating software modifications for remote node management according to some examples of the present disclosure.

FIG. 3 is a flowchart of a process for coordinating software modifications for remote node management according to some examples of the present disclosure. In some examples, the processing device 202 can implement some or all of the steps shown in FIG. 3. Additionally, in some examples, the processing device 202 can be executing the conversion engine 110 of FIG. 1 to implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processing device 202 detects, at a first time, a code modification 114 made to a first configuration file 108 of a software entity 208 on a particular node 210 of a plurality of nodes 212. The first configuration file 108 can be infrastructure as code that can be executed by a control node 102 to deploy the software entity 208 to each node 210 of the plurality of nodes 212. In some examples, the plurality of nodes 212 can include different types of nodes. For example, the first configuration file 108 can include instructions for deploying a container to the plurality of nodes 212, which can include a virtual machine node and a server node. The virtual machine may require adjustments to the configuration of the container (e.g., the code modification 114 detected by the processing device 202).

At block 304, the processing device 202 converts the code modification 114 from a first format 116*a* associated with the control node 102 to a second format 116*b* associated with the software entity 208. The first format 116*a* in which the code modification 114 is made may be a format of the infrastructure as code used by the control node 102 to manage deployment of the software entity 208 (e.g., Ansible by Red Hat®, Terraform by Hashicorp, or any other suitable infrastructure as code tools). The second format 116*b* may be a format of a second configuration file 112 used to build the container on the plurality of nodes 212 (e.g., a Containerfile retrieved from a container registry). The processing device 202 can use a lookup table or other translation mechanism to identify first format 116*a* (e.g., Ansible) commands in the code modification 114 to second format 116*b* (e.g., Containerfile) commands. The processing device 202 can then convert the code modification 114 based on a mapping between control node commands and software entity commands.

In some examples, the processing device 202 can generate metadata 113 for the first configuration file 108 that includes a mapping between the node 210 with the code modification 114 (e.g., the virtual machine) and the code modification 114. For example, the metadata 113 can include the code modification 114 converted to the second format 116*b* with an indication that the converted code modification 114 is to be applied to the particular node 210.

At block 306, the processing device 202 detects, at a second time, the control node 102 executing the first configuration file 108 to deploy the software entity 208 to each node 210 of the plurality of nodes 1212 according to a second configuration file 112 for the software entity 208. The second time can be after the first time. For example, the processing device 202 may detect that the control node 102 is re-deploying the container to the virtual machine node and the server node. Or, the processing device 202 may detect that the control node 102 is deploying an update to the container to the virtual machine node and the server node.

This subsequent deployment of the software entity 208 may not initially include the code modification 114.

At block 308, the processing device 202 applies, for the particular node 210, the code modification 114 in the second format 116*b* to the second configuration file 112. The control node 102 can deploy the software entity 208 to the particular node 210 using the code modification 114 applied to the second configuration file 112. For example, the code modification 114 can be applied in the second format 116*b* based on the metadata 113. The control node 102 can deploy the software entity 208 to the other nodes in the plurality of nodes 212 (e.g., a set of nodes that does not include the particular node 210) by using the second configuration file 112 without the applied code modification 114. That is, the code modification 114 may be applied only to the particular node 210 for subsequent redeployments of the software entity 208. This can avoid unnecessary application of the code modification 114 to other nodes (e.g., modified settings for a virtual machine that may not be applicable to a server).

In some examples, the processing device 202 may also generate an updated second configuration file 112 based on the first configuration file 108 and the code modification 114. For example, the processing device 202 can abstract a container configuration file from the first configuration file 108 that includes the code modification 114 to generate the updated second configuration file. This updated second configuration file can be stored in a software repository that can be used for subsequent deployments of the software entity 208 to include the code modification 114 for the particular node 210. Further, once the processing device 202 detects that the control node 102 has deployed the software entity 208 to the particular node 210 using the updated second configuration file, the processing device 202 can remove the metadata 113 associated with the code modification 114 from the first configuration file 108. Subsequent deployments of the updated second configuration file can be accessed directly from the software repository.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a non-transitory memory comprising instructions that are executable by the processing device for causing the processing device to:

detect, at a first time, a code modification made to a first configuration file stored on a particular node of a plurality of nodes, wherein the first configuration file is a locally stored copy of an infrastructure as code (IaC) file, wherein the IaC file is executable by a control node to automatically deploy a software entity to each node of the plurality of nodes using a second configuration file that is of a different type than the IaC file, and wherein the code modification is written in a first format of the IaC file;

based on detecting the code modification, convert the code modification from the first format of the IaC file to a second format of the second configuration file, the second format being different from the first format, thereby generating a converted code modification that is compatible with the second configuration file;

after generating the converted code modification, detect, at a second time, the control node executing the IaC file to deploy the software entity to each node of the plurality of nodes using the second configuration file; and in response to detecting the control node executing the IaC file to deploy the software entity to the plurality of nodes:

determine that the converted code modification is to be applied to the particular node; and based on determining that the converted code modification is to be applied to the particular node, apply the converted code modification to the second configuration file when deploying the software entity to the particular node using the second configuration file.

2. The system of claim 1, wherein the memory further comprises instructions that are executable by the processing device for causing the processing device to, subsequent to converting the code modification from the first format to the second format:

generate, based on the first configuration file and the code modification, an updated second configuration file; and store the updated second configuration file for use in deploying the software entity with the code modification to the particular node.

3. The system of claim 2, wherein the memory further comprises instructions that are executable by the processing device for causing the processing device to:

detect the control node deploying the software entity to the particular node using the updated second configuration file; and remove metadata associated with the code modification from the first configuration file based on detecting the control node deploying the software entity to the particular node using the updated second configuration file.

4. The system of claim 1, wherein the memory further comprises instructions that are executable by the processing device for causing the processing device to, subsequent to converting the code modification from the first format to the second format:

generate metadata for the first configuration file comprising a mapping between the particular node and the code modification; and apply the converted code modification to the second configuration file when deploying the particular node based on the metadata.

5. The system of claim 1, wherein the memory further comprises instructions that are executable by the processing device for causing the processing device to convert the code modification from the first format to the second format based on a predefined mapping between a first set of commands in the first format and a second set of commands in the second format.

6. The system of claim 1, wherein the particular node is a first node, and wherein the control node is configured to, while executing the IaC file to deploy the software entity to the plurality of nodes:

determine that the converted code modification is not to be applied to a second node of the plurality of nodes; and based on determining that the converted code modification is not to be applied to the second node of the plurality of nodes, deploy the software entity to the second node of the plurality of nodes using the second configuration file without the converted code modification.

7. The system of claim 1, wherein the first configuration file is an Ansible playbook, the second configuration file is a Containerfile, and the software entity is a container.

8. A method comprising:

detecting, at a first time and by a processing device, a code modification made to a first configuration file stored on a particular node of a plurality of nodes, wherein the first configuration file is a locally stored copy of an infrastructure as code (IaC) file, wherein the IaC file is executable by a control node to automatically deploy a software entity to each node of the plurality of nodes using a second configuration file that is of a different type than the IaC file, and wherein the code modification is written in a first format of the IaC file;

based on detecting the code modification, converting, by the processing device, the code modification from the first format of the IaC file to a second format of the second configuration file, the second format being different from the first format, thereby generating a converted code modification that is compatible with the second configuration file;

after generating the converted code modification, detecting, at a second time and by the processing device, the control node executing the IaC file to deploy the software entity to each node of the plurality of nodes using the second configuration file; and in response to detecting the control node executing the IaC file to deploy the software entity to the plurality of nodes:

determining, by the processing device, that the converted code modification is to be applied to the particular node; and based on determining that the converted code modification is to be applied to the particular node, applying, by the processing device, the converted code modification to the second configuration file when deploying the software entity to the particular node using the second configuration file.

9. The method of claim 8, further comprising, subsequent to converting the code modification from the first format to the second format:

generating, based on the first configuration file and the code modification, an updated second configuration file; and storing the updated second configuration file for use in deploying the software entity with the code modification to the particular node.

10. The method of claim 9, further comprising:

detecting the control node deploying the software entity to the particular node using the updated second configuration file; and removing metadata associated with the code modification from the first configuration file based on detecting the control node deploying the software entity to the particular node using the updated second configuration file.

11. The method of claim 8, further comprising, subsequent to converting the code modification from the first format to the second format:

generating metadata for the first configuration file comprising a mapping between the particular node and the code modification; and applying the converted code modification to the second configuration file when deploying the particular node based on the metadata.

12. The method of claim 8, further comprising converting the code modification from the first format to the second format based on a predefined mapping between a first set of commands in the first format and a second set of commands in the second format.

13. The method of claim 8, wherein the particular node is a first node, and wherein the control node is configured to, based on executing the IaC file to deploy the software entity to the plurality of nodes:

determine that the converted code modification is not to be applied to a second node of the plurality of nodes; and based on determining that the converted code modification is not to be applied to the second node of the plurality of nodes, deploy the software entity to the second node of the plurality of nodes using the second configuration file without the converted code modification.

14. The method of claim 8, wherein the first configuration file is an Ansible playbook, the second configuration file is a Containerfile, and the software entity is a container.

15. A non-transitory computer-readable medium comprising program code that is executable by a processing device for causing the processing device to perform operations comprising:

detect, at a first time, a code modification made to a first configuration file stored on a particular node of a plurality of nodes, wherein the first configuration file is a locally stored copy of an infrastructure as code (IaC) file, wherein the IaC file is executable by a control node to automatically deploy a software entity to each node of the plurality of nodes using a second configuration file that is of a different type than the IaC file, and wherein the code modification is written in a first format of the IaC file;

based on detecting the code modification, convert the code modification from the first format of the IaC file to a second format of the second configuration file, the second format being different from the first format;

after generating the converted code modification, detect, at a second time, the control node executing the IaC file to deploy the software entity to each node of the plurality of nodes using the second configuration file; and in response to detecting the control node executing the IaC file to deploy the software entity to the plurality of nodes:

determine that the converted code modification is to be applied to the particular node; and based on determining that the converted code modification is to be applied to the particular node, apply the converted code modification to the second configuration file when deploying the software entity to the particular node using the second configuration file.

16. The non-transitory computer-readable medium of claim 15, wherein the program code is further executable by the processing device for causing the processing device to, subsequent to converting the code modification from the first format to the second format:

generate, based on the first configuration file and the code modification, an updated second configuration file; and store the updated second configuration file for use in deploying the software entity with the code modification to the particular node.

17. The non-transitory computer-readable medium of claim 16, wherein the program code is further executable by the processing device for causing the processing device to:

detect the control node deploying the software entity to the particular node using the updated second configuration file; and remove metadata associated with the code modification from the first configuration file based on detecting the control node deploying the software entity to the particular node using the updated second configuration file.

18. The non-transitory computer-readable medium of claim 15, wherein the program code is further executable by the processing device for causing the processing device to, subsequent to converting the code modification from the first format to the second format:

generate metadata for the first configuration file comprising a mapping between the particular node and the code modification; and apply the converted code modification to the second configuration file when deploying the particular node based on the metadata.

19. The non-transitory computer-readable medium of claim 15, wherein the program code is further executable by the processing device for causing the processing device to convert the code modification from the first format to the second format based on a mapping between control node commands and software entity commands.

20. The non-transitory computer-readable medium of claim 15, wherein the particular node is a first node, and wherein the control node is configured to;

determine that the converted code modification is not to be applied to a second node of the plurality of nodes; and based on determining that the converted code modification is not to be applied to the second node of the plurality of nodes, deploy the software entity to the second node of the plurality of nodes using the second configuration file without the converted code modification.

* * * * *